United States Patent [19]

Iwamura et al.

[11] Patent Number: 5,214,080
[45] Date of Patent: May 25, 1993

[54] PROCESS FOR PRODUCING NONAQUEOUS DISPERSION-TYPE RESIN

[75] Inventors: Goro Iwamura, Sakai; Hidetoshi Konno, Izumi-ohtsu; Akio Shoji, Kishiwada, all of Japan

[73] Assignee: Dainippon Ink and Chemicals, Inc., Tokyo, Japan

[21] Appl. No.: 810,283

[22] Filed: Dec. 19, 1991

Related U.S. Application Data

[63] Continuation of Ser. No. 560,285, Jul. 30, 1990, abandoned, which is a continuation of Ser. No. 270,061, Nov. 14, 1988, abandoned.

[30] Foreign Application Priority Data

May 15, 1987 [JP] Japan .................. 2-116975

[51] Int. Cl.$^5$ ................................. C08J 3/02
[52] U.S. Cl. ............................ 523/336; 523/339; 524/530; 524/531; 524/533; 524/535; 524/923
[58] Field of Search ............ 524/530, 531, 533, 535, 524/923; 523/336, 339

[56] References Cited

U.S. PATENT DOCUMENTS

| | | | |
|---|---|---|---|
| 3,419,515 | 12/1968 | Schmadle et al. | 524/531 |
| 3,560,456 | 2/1971 | Hazen et al. | 528/496 |
| 3,686,111 | 8/1972 | Makhlouf et al. | 524/530 |
| 3,814,720 | 6/1974 | Maker | 524/531 |
| 4,107,110 | 8/1978 | Lachowicz et al. | 524/9 |
| 4,818,792 | 4/1989 | Martin et al. | 525/286 |

FOREIGN PATENT DOCUMENTS 58-196270A 11/1983 Japan .

*Primary Examiner*—Paul R. Michl
*Assistant Examiner*—John J. Guarriello
*Attorney, Agent, or Firm*—Sherman and Shalloway

[57] ABSTRACT

A process for the production of a nonaqueous dispersion-type resin having excellent dispersion stability and a uniform particle size, which comprises uniformly polymerizing in an aliphatic and/or alicyclic hydrocarbon-type organic solvent a vinyl monomer having a solubility parameter different by 1.1 or more from that of said organic solvent, or a vinyl monomer mixture containing at least 1% by weight of said monomer and a reactive resin soluble in said hydrocarbon-type organic solvent and having a molecular weight of 2,000 or more, and then replacing the organic solvent in the obtained uniform polymer solution with another organic solvent that does not dissolve the nonaqueous dispersion-type resin to thereby conduct phase inversion into a non-aqueous dispersion.

8 Claims, No Drawings

PROCESS FOR PRODUCING NONAQUEOUS DISPERSION-TYPE RESIN

This application is a continuation of application Ser. No. 07/560,285, filed Jul. 30, 1990, now abandoned, which is a continuation of application Ser. No. 07/270,061 filed Nov. 14, 1988, now abandoned.

This invention relates to a process for the production of a novel useful nonaqueous dispersion-type resin. More specifically, this invention relates to a process for the production of a nonaqueous dispersion-type resin with polymer particles stabilized to agglomeration in a solvent not dissolving the resin, which comprises subjecting a vinyl-type uniform polymer solution containing more than fixed amounts of monomers different in solubility to phase inversion using a specific solvent.

As a conventional method for producing a non-aqueous dispersion-type resin, there is a method wherein in a solvent in which monomers are soluble but a polymer composed of said monomers is insoluble, a mixture of such monomers is polymerized and pulverized. However, a monomer greatly different from a solvent in solubility parameter has insufficient solubility in a dispersion solvent. Accordingly, there is a defect that in the polymerization in this type of the solvent, polymer particles having a uniform particle size can hardly be obtained.

In the conventional method, the particle size is adjusted by making the solubility parameter of the dispersion solvent close to that of the monomer. This amounts however to limiting freedom of dispersibility in a solvent and results in providing only a nonaqueous dispersion-type resin having a nonuniform particle size and poor stability. A paint using the nonaqueous dispersion-type resin having the nonuniform particle size and the poor stability, obtained by such method, often allows formation of "rugged surface".

The aforesaid defect is notably seen in using a monomer much different in solubility parameter from an aliphatic hydrocarbon solvent and/or an alicyclic hydrocarbon solvent, e.g. a hydroxyl group-containing monomer, a carboxyl group-containing monomer or a vinyl monomer mixture containing these monomers, or in dispersing in a solvent, e.g. an acrylic copolymer much different in solubility parameter from a solvent having a high polarity such as an alcohol solvent.

It is an object of this invention to provide a process which can produce a nonaqueous dispersion-type resin having a uniform particle size even in case of a combination of such inconvenient materials.

The present inventors have made extensive studies to achieve this object, and consequently found that a reactive resin capable of stabilizing particles in a dispersion solvent (an aliphatic and/or alicyclic hydrocarbon-type organic solvent) is used as a dispersant component, a specific monomer or a monomer mixture is uniformly polymerized in a polymerization solvent, and the polymerization solvent in the thus obtained uniform polymerization system is replaced with a dispersion solvent (aliphatic and/or alicyclic hydrocarbon-type organic solvent) to thereby conduct phase inversion into an intended nonaqueous dispersion.

Thus, the present invention provides a process for the production of a nonaqueous dispersion-type resin having excellent dispersion stability and a uniform particle size, comprises uniformly polymerizing in an aliphatic and/or alicyclic hydrocarbon-type organic solvent a vinyl monomer having a solubility parameter different by 1.1 or more from that of said organic solvent, or a vinyl monomer mixture containing at least 1% by weight of said monomer and a reactive resin soluble in said hydrocarbon-type organic solvent and having a molecular weight of 2,000 or more, and then replacing the organic solvent in the obtained uniform polymer solution with another organic solvent that does not dissolve the nonaqueous dispersion-type resin to thereby conduct phase inversion into a nonaqueous dispersion.

The aforesaid reactive resin is a resin soluble in the aliphatic and/or alicyclic hydrocarbon-type organic solvent as the dispersion solvent, containing in a molecule one or more functional groups (reactive groups) of the vinyl monomer mixture and having a molecular weight of 2,000 or more.

The vinyl monomer or the vinyl monomer mixture as a monomer forming particles and the reactive resin as a grafting backbone polymer are classified as follows, for example, depending on functional groups (reactive groups) thereof.

| Functional group of a vinyl monomer or a vinyl monomer mixture as a monomer forming particles | Functional group being introduced into a reactive resin (grafting resin) as a grafting polymer |
| --- | --- |
| ethylenically unsaturated bond | ethylenically unsaturated bond |
| carboxylic acid (carboxyl group) | epoxide (epoxy group) amine (amino group) |
| sulfonic acid (sulfoxyl group) | amine (amino group) |
| phosphonic acid (phosphoxyl group) | hydroxymethylamide group alkoxymethylamide group dialkylaminomethylamide group alkylcarbonyloxymethylamide group |
| acid anhydride (acid anhydride group) | epoxide (epoxy group) amine (amino group) hydroxyl group |
| carbonyl chloride sulfonyl chloride | amine (amino group) |
| reactive ester linkage | amine (amino group) |
| hydroxyl group | epoxide (epoxy group) isocyanate group |
| epoxide (epoxy group) | amine (amino group) |
| isocyanate group | amine (amino group) reactive hydrogen-containing compound (active hydrogen) |
| reactive chlorine compound (reactive chlorine) | amine (amino group) hydroxyl group |

As listed above, relative to the reactive resin having the ethylenically unsaturated bond, the vinyl monomer having the ethylenically unsaturated bond or the mixture of such vinyl monomers is available as the polymer forming particles. Relative to the reactive resin having the epoxy group, the vinyl monomer having the carboxyl group or the mixture of such vinyl monomers is available as the monomer forming particles. Relative to the reactive resin having the amino group alone, the vinyl monomer having the sulfoxyl group, the vinyl monomer having carbonyl chloride, the vinyl monomer having the reactive ester linkage, or the mixture of these monomers is available as the monomer forming particles.

In this way, the above reactive resins as the grafting resin having the various functional groups or reactive groups can be designed depending on the functional groups or reactive groups of the vinyl monomers or vinyl monomer mixture as the monomer forming particles.

Typical of the grafting resin, i.e. the reactive resin soluble in the aliphatic and/or alicyclic hydrocarbon-type organic solvent and having the molecular weight of 2,000 or more are a polymer composed mainly of a monomer being an alkyl (meth)acrylate having an alkyl group with 4 or more carbon atoms, a polymer composed mainly of a vinyl monomer having 4 or more carbon atoms, an alkyd resin containing an ethylenically unsaturated bond, and a vinyl-modified alkyd resin obtained by grafting a vinyl monomer on the alkyd resin as a trunk polymer.

The molecular weight of the reactive resin as the grafting resin has to be 2,000 or more. When it is less than 2,000, dispersion stability of particles after phase inversion can hardly be secured; it is thus undesirable.

Examples of the monomer having a solubility parameter different by 1.1 or more from that of the aliphatic and/or alicyclic hydrocarbon-type organic solvent as the dispersion solvent are shown below.

The "solubility parameter" used here is "Solubility Parameter Values" described in "Polymer Handbook", pp. 341–347 as such or a value calculated on the basis of these values. Examples of the solubility parameter are as follows.

| | |
|---|---|
| n-pentane | 7.0 |
| n-heptane | 7.4 |
| methylcyclohexane | 7.8 |
| "Solvesso 150" (a tradename for an aromatic hydrocarbon mixture made by Exxon Chemical K.K., U.S.A.) | 8.5 |
| isoprene | 7.4 |
| n-dodecane | 7.9 |
| "Shellsol 72" (a tradename for an aliphatic hydrocarbon solvent made by Shell K.K., Holland) | 7.2 |
| n-hexane | 7.3 |
| "VM & P Naphtha" (a tradename for an aliphatic hydrocarbon solvent made by Shell K.K.) | 7.6 |
| "Shell TB 28 Solvent" (a tradename for an aliphatic hydrocarbon solvent made by Shell K.K.) | 7.4 |

Typical examples of the monomer having the solubility parameter different by 1.1 or more from that of the hydrocarbon-type organic solvent are carboxyl group-containing ethylenically unsaturated monomers such as (meth)acrylates; and hydroxyl group-containing ethylenically unsaturated monomers such as beta-hydroxyethyl (meth)acrylate and beta-hydroxybutyl (meth)acrylate; (meth)acrylate monomers such as methyl (meth)acrylate and ethyl (meth)acrylate; ethylenically unsaturated dicarboxylic acids or their anhydrides such as maleic acid, fumaric acid, itaconic acid and their anhydrides; and nitrogen atom-containing ethylenically unsaturated monomers such as acrylamide, N,N-dimethylaminoethyl (meth)acrylate and N,N-diethylaminopropyl (meth)acrylate.

Monomers having a solubility parameter difference of less than 1.1 or a combination thereof gives half-dissolved particles and does not allow sufficient dispersion, which is therefore undesirous in this invention.

Typical examples of the ethylenically unsaturated monomer copolymerizable with the aforesaid various monomers are various (meth)acrylate monomers such as n-propyl (meth)acrylate, iso-propyl (meth)acrylate, n-butyl (meth)acrylate, iso-butyl (meth)acrylate, sec-butyl (meth)acrylate, tert-butyl (meth)acrylate, 2-ethylhexyl (meth)acrylate, lauryl (meth)acrylate, cyclohexyl (meth)acrylate and benzyl (meth)acrylate; dialkyl ($C_1$–$C_4$) esters of ethylenically unsaturated dicarboxylic acids such as diethyl maleate, dimethyl fumarate, dibutyl maleate, dibutyl fumarate and dibutyl itaconate; a cyano group-containing ethylenically unsaturated monomers such as acrylonitrile; various vinyl esters such as vinyl acetate, vinyl benzoate and "Veova" (a tradename for a branched aliphatic carboxylic acid vinyl ester made by Shell K.K.); various (per)fluoroalkyl group-containing monomers such as "Viscoat 8F, 8FM, 3F or 3FM" (a tradename for a fluorine-containing (meth)acrylate made by Osaka Yuki Kagaku K.K.); halogenated olefins such as vinyl chloride, vinylidene chloride, vinyl fluoride, vinylidene fluoride and chlorotrifluoroethylene; and aromatic vinyl monomers such as styrene, alpha-methylstyrene, p-tert-butylstyrene and vinyltoluene.

Examples of the organic solvent for polymerization used in conducting the solution radical polymerization using the aforesaid various monomers are esters such as methyl acetate, ethyl acetate, n-butyl acetate and amyl acetate; ketones such as acetone, methyl ethyl ketone, methyl isobutyl ketone, methyl amyl ketone and cyclohexanone; and alcohols such as methanol, ethanol, i-propyl alcohol and n-butanol. Moreover, the conjoint use of an aromatic hydrocarbon solvent such as toluene or xylene and the above alcohol solvent is also available.

Such solution radical polymerization may be carried out in a usual manner using the aforesaid organic solvent for polymerization and a radical polymerization initiator (catalyst) such as an azo compound typified by azobisisobutyronitrile or a peroxide typified by benzoyl peroxide. On that occasion, if required, a chain transfer agent such as lauryl mercaptan, octyl mercaptan or alpha-methylstyrene dimer may be used as a molecular weight modifier.

In the process of this invention, the polymerization is performed using the aforesaid starting materials, and subsequently, while removing the organic solvent from the obtained uniform polymer solution, the solvent is parallelly replaced by adding dropwise an organic solvent composed mainly of an aliphatic and/or alicyclic hydrocarbon-type organic solvent to the system. In that case, the viscosity of the system increases most drastically when the ratio of the alcohol, ketone or ester solvent as a good solvent and the aliphatic and/or alicyclic hydrocarbon-type organic solvent as a poor solvent reaches a fixed value (the value varies with a type of a solvent and a structure of a resin). When the ratio is outside said fixed value and the amount of the aliphatic and/or alicyclic hydrocarbon solvent is larger, the viscosity decreases.

Examples of the aliphatic hydrocarbon-type organic solvent are, besides the aforesaid examples, "LAWS" (a tradename for a product made by Shell K.K., Holland), "Isoper E or G" (a tradename for a product made by Exxon Chemical K.K.), "Naphtha No. 5 or No. 6" (a tradename for a product made by Exxon Chemical K.K.), "IP Solvent 1620" (a tradename for a product made by Idemitsu Sekiyu Kagaku K.K.) and "Whitesol" (a tradename for a product made by Kyodo Sekiyu K.K.). A solvent mixture of the aliphatic hydrocarbon solvent and the aromatic hydrocarbon solvent is also included in this invention. In this instance, the aliphatic hydrocarbon solvent has to be used in an amount of 50% by weight or more.

Meanwhile, typical examples of the alicyclic hydrocarbon solvent are cyclohexane and ethylcyclohexane. The conjoint use of the alicyclic hydrocarbon solvent and the above aliphatic hydrocarbon solvent as well as the conjoint use of the alicyclic hydrocarbon solvent and the aromatic hydrocarbon solvent is also included in this invention. In case of the conjoint use of the alicyclic hydrocarbon solvent and the aromatic hydrocarbon solvent, the amount of the alicyclic hydrocarbon solvent has to be 50% by weight or more.

Of course, such merit can be expected that as the difference in boiling point between the polymerization solvent (the above organic solvent) and the dispersion solvent (the above aliphatic and/or alicyclic hydrocarbon solvent) is greater, the final dispersion can be produced for a shorter period of time.

Where iso-propyl alcohol or methyl ethyl ketone is combined with "LAWS" or "Isoper E", the above merit in production is expectable. On the contrary, in case of such combination that boiling points of solvents are close to each other with a difference of less than 20° C., it takes a long time to replace the solvent. For this reason, it is advisable to select a combination of the solvents such that the difference in boiling point is 20° C. or higher.

Thus, the process of this invention can provide a nonaqueous dispersion-type resin having a high carboxyl group content, an average particle size of about 0.1 to 0.8 micron and excellent stability.

The nonaqueous dispersion-type resin having these varied characteristics is available as a coating, a bonding agent or a sealer.

The following Referential Examples, Examples and Comparative Examples illustrate this invention more specifically. Parts and percentages in these examples are all by weight unless otherwise indicated.

REFERENTIAL EXAMPLE 1

Preparation Example of an Ethylenically Unsaturated Bond-Containing Reactive Resin A four-necked flask fitted with a thermometer, a stirrer, a reflux condenser and a nitrogen gas introducing inlet was charged with 66.7 parts of "Isoper E" and 0.3 part of di-tert-butyl peroxide, and heated up to 120° C. When said temperature was reached, a mixture comprising 97 parts of n-butyl methacrylate, 6 parts of tert-butyl peroctoate and 2 parts of thioglycolic acid were added dropwise over the course of 5 hours. Even after the addition was over, the reaction continued at the same temperature for 5 hours.

Subsequently, 3 parts of glycidyl methacrylate (GMA) was added, and the reaction was carried out at 125° C. for 4 hours. There resulted a final resin having a nonvolatile content of 60%, a Gardner viscosity at 25° C. (the same applies to the following) of X and a number-average molecular weight ($\overline{M}n$) of 4,000. This is designated RR-1.

REFERENTIAL EXAMPLE 2

Preparation Example of an Epoxy Group-Containing Reactive Resin

The same flask as used in Referential Example 1 was charged with 100 parts of "LAWS" and 0.2 part of di-tert-butyl peroxide, and heated up to 120° C. When said temperature was reached, a mixture comprising 98 parts of iso-butyl methacrylate, 2 parts of GMA and 8 parts of tert-butyl peroctoate was added dropwise over the course of 6 hours. Even after the addition was over, the same temperature was kept for 5 hours. There resulted a final resin having a nonvolatile content of 50%, a viscosity of E and $\overline{M}n$ of 5,500. This is designated RR-2.

REFERENTIAL EXAMPLE 3

Preparation Example of an Amino Group-Containing Reactive Resin

The procedure in Referential Example 2 was repeated except that the same amount of N,N-dimethylaminoethyl methacrylate was used instead of GMA. There was obtained a final resin having a nonvolatile content of 50%, a viscosity of D and $\overline{M}n$ of 6,000. This is designated RR-3.

REFERENTIAL EXAMPLE 4

Preparation Example of an Isocyanate Group-Containing Reactive Resin

The procedure in Referential Example 2 was repeated except that the same amount of isocyanate ethyl methacrylate was used instead of GMA. There was obtained a final resin having a nonvolatile content of 50%, a viscosity of G and $\overline{M}n$ of 6,300. This is designated RR-4.

REFERENTIAL EXAMPLE 5

Preparation Example of a Hydroxyl Group-Containing Reactive Resin

The procedure in Referential Example 2 was repeated except that the same amount of beta-hydroxyethyl methacrylate was used instead of GMA. There was obtained a final resin having a nonvolatile content of 50%, a viscosity of I and $\overline{M}n$ of 6,900. This is designated RR-5.

REFERENTIAL EXAMPLE 6

Preparation Example of a Hydroxymethylamide Group-Containing Reactive Resin

The procedure in Referential Example 2 was repeated except that the same amount of methylolacrylamide was used instead of GMA. There was obtained a final resin having a nonvolatile content of 50.3%, a viscosity of S and $\overline{M}n$ of 8,000. This is designated RR-6.

EXAMPLE 1

The same flask as used in Referential Example 1 was charged with 20 parts of iso-propyl alcohol, 40 parts of methyl ethyl ketone and 0.2 part of di-tert-butyl peroxide, and heated up to 80° C. Subsequently, 10 parts of methyl methacrylate, 20 parts of styrene, 30 parts of ethyl acrylate, 5 parts of beta-hydroxyethyl methacrylate, 15 parts of methacrylic acid, 40 parts of the reactive resin RR-1 being a so-called polymerizable monomer obtained in Referential Example 1, 3 parts of tert-butyl peroctoate and 20 parts of i-propyl alcohol was added dropwise over the course of 5 hours. Even after the addition was over, the reaction contained at the same temperature. There resulted a solution of a vinyl resin (a so-called uniform polymer) having a nonvolatile content of 50% and a viscosity of Y.

Subsequently, while the temperature was progressively raised from 80° C., iso-propyl alcohol and methyl ethyl ketone were distilled off from the system, and at the same time "Isoper E" was added dropwise to the system. When 100° C. was reached, distilling off of 80 parts of iso-propyl alcohol and methyl ethyl ketone was completed, and the addition of "Isoper E" was therefore finished.

Thus, the final nonaqueous dispersion-type resin, i.e. the nonaqueous dispersion of the vinyl resin was obtained. This was an opalescent nonaqueous dispersion having a nonvolatile content of 50% and a viscosity of P-Q.

An average particle size of the resin was measured by Coulter Model N-4 of a Sub-micron particle analyzer manufactured by Coulter Electronics, U.S.A. (the same applies to the following), and found to be 0.15 micron.

EXAMPLES 2 to 8

The procedure in Example 1 was followed except changing the polymerization solvent, the polymerizable monomer mixture and the catalyst as shown in Table 1. There were obtained various resin solutions.

Properties (nonvolatile content, viscosity and $\overline{Mn}$) of each of the resin solutions are shown in Table 1.

Subsequently, the procedure in Example 1 was followed except changing the organic solvent for dispersion as shown in Table 2. There were obtained various opalescent nonaqueous dispersions.

Properties (nonvolatile content, viscosity and average particle size) and stability of each of the nonaqueous dispersions are shown in Table 2.

The dispersion stability was evaluated as follows.

Namely, 12 g of each of the nonaqueous dispersion-type resins (nonaqueous dispersions) was sampled in a vistube, and centrifuged by a centrifugal separator at 2,000 rpm for 4 hours. Thereafter, both a supernatant liquid and a precipitate were evaluated by visual observation.

⊚ ... A supernatant layer is 0 mm (uniform dispersion).
○ ... A supernatant layer is less than 2 mm (good dispersion).
Δ ... A supernatant layer is 2 to 10 mm.
× ... A supernatant layer exceeds 10 mm.

COMPARATIVE EXAMPLE 1

The same flask as used in Referential Example 1 was charged with 10 parts of "Isoper E", 2 parts of di-tert-butyl peroxide and 40 parts of RR-1 obtained in Referential Example 1. Further, 10 parts of methyl methacrylate, 20 parts of styrene, 30 parts of ethyl acrylate, 5 parts of beta-hydroxyethyl methacrylate, 15 parts of methacrylic acid, 20 parts of "Isoper E" and 3 parts of tert-butyl peroctoate was added dropwise over the course of 5 hours. Even after the addition was over, the same temperature was maintained for 5 hours and the polymerization was completed.

The thus obtained dispersion was however sticked to the wall of the flask and the stirring rod, and many blocked lumps were also observed.

Naturally, the dispersion was soon separated into two layers.

COMPARATIVE EXAMPLE 2

The procedure in Comparative Example 1 was followed except using monomer mixtures shown in Table 1. There were obtained nonaqueous dispersion-type resins (control dispersions).

Properties and dispersion stability of the nonaqueous dispersion-type resins were measured with the results shown in Table 2.

COMPARATIVE EXAMPLE 3

The procedure in Example 1 was followed except using monomer mixtures shown in Table 1. There were obtained nonaqueous dispersion-type resins (control dispersions).

The thus obtained dispersions were however sticky and after 1 day, became cheese-like substances showing a gel condition.

TABLE 1

| Uniform polymer | Example | | | | | | | | | Comparative Example | | |
|---|---|---|---|---|---|---|---|---|---|---|---|---|
| | 1 | 2 | 3 | 4 | 5 | 6 | 7 | 8 | 9 | 1 | 2 | 3 |
| Polymerizable monomers | | | | | | | | | | | | |
| RR-1 | 40 | | | | | | | | 40 | 40 | 40 | 40 |
| RR-2 | | 30 | | | | | | | | | | |
| RR-3 | | | 40 | | | | | | 40 | | | |
| RR-4 | | | | 28 | | | | | | | | |
| RR-5 | | | | | 32 | | 30 | | | | | |
| RR-6 | | | | | | 30 | 35 | | | | | |
| Methyl methacrylate | 10 | 20 | 30 | 30 | 21 | 20 | 15 | 35 | | 10 | 0.5 | 0.5 |
| Ethyl acrylate | 30 | | | | 10 | | | | | 30 | 49.5 | 49.5 |
| n-Butyl methacrylate | | 15 | | | | 20 | 20 | | | | 30 | 30 |
| n-Butyl acrylate | | | 30 | 16 | 10 | | | 15 | | | | |
| Styrene | 20 | 30 | | 20 | 20 | 20 | 10 | 5 | | 20 | | |
| Methacrylic acid | 15 | 20 | | | 18 | | | | | 15 | | |
| Vinyl phosphonate | | | | | | 3 | | | | | | |
| β-Hydroxyethyl methacrylate | 5 | | 15 | 20 | | 22 | | 20 | 80 | 5 | | |
| Maleic acid | | | | | 5 | | | | | | | |
| GMA | | | 5 | | | | 5 | | | | | |

TABLE 1-continued

| Uniform polymer | Example 1 | 2 | 3 | 4 | 5 | 6 | 7 | 8 | 9 | Comparative Example 1 | 2 | 3 |
|---|---|---|---|---|---|---|---|---|---|---|---|---|
| Isocyanate ethyl methacrylate | | | | | | | 5 | | | | | |
| Polymerization solvent | | | | | | | | | | | | |
| Methyl ethyl ketone | 40 | 45 | 80 | 86 | 84 | 85 | 85 | | 40 | | | 40 |
| i-propyl alcohol | 40 | 40 | | | | | | 80 | 40 | | | 40 |
| Catalyst | | | | | | | | | | | | |
| tert-Butyl oxide | 3 | 2 | 1.5 | 2.5 | 1 | 4.2 | 1 | 2.5 | 4 | 3 | 3 | 3 |
| di-tert-Butyl peroxide | 2 | 2 | 1 | 1.2 | 2 | 1 | 1 | 1 | 2 | 2 | 2 | 2 |
| tert-Butyl peroxybenzoate | | | | 0.2 | 0.5 | | | 0.2 | 3.2 | | | |
| Polymerization temperature (°C.) | | | | | 80 | | | | | | 80 | |
| Properties | | | | | | | | | | | | |
| Nonvolatile content (%) | 50.0 | 50.0 | 50.2 | 50.8 | 50.2 | 50.2 | 49.5 | 50.5 | 50.2 | 50.0 | 50.0 | 50.0 |
| Viscosity | Y | $Z_1$ | $Z-Z_1$ | $Z_3$ | $Z_2$ | Y | $Z_4$ | Z | $Z_2$ | — | $Z_7$ | U |
| Mn | 14,000 | 15,200 | 18,000 | 17,500 | 17,000 | 11,000 | 18,000 | 16,000 | 15,000 | 14,000 | 14,000 | 13,500 |

TABLE 2

| | Example 1 | 2 | 3 | 4 | 5 | 6 | 7 | 8 | 9 | Comparative Example 1 | 2 | 3 |
|---|---|---|---|---|---|---|---|---|---|---|---|---|
| Nonaqueous dispersion-type resin | | | | | | | | | | | | |
| Dispersion solvent | | | | | | | | | | | | |
| "LAWS" | | | | 86 | | | | 80 | | | | |
| Methylcyclohexane | | | | | 85 | | | | | | | |
| "Isoper E" | 80 | | 80 | | 84 | | | | 80 | 80 | 80 | 80 |
| "VH & P Naphtha" | | 85 | | | | | 85 | | | | | |
| Difference in solubility parameter | 5.51 | 5.31 | 2.1 | 2.1 | 5.31 | 5.51 | 1.43 | 2.1 | 2.1 | 5.51 | 1.0 | 1.0 |
| Properties | | | | | | | | | | | | |
| Nonvolatile content (%) | 52.1 | 50.2 | 50.2 | 50.8 | 50.0 | 50.2 | 50.2 | 49.5 | 50.2 | 50.2 | 50.3 | 50.3 |
| Viscosity | P-Q | L-M | Q-R | S-T | O-P | Z | C | T | G-H | — | $Z_2$ | >$Z_3$ |
| Average particle size (micron) | 0.15 | 0.12 | 0.21 | 0.25 | 0.13 | 0.32 | 0.14 | 0.30 | 0.18 | — | 0.20 | — |
| Dispersions stability | | | | | ⊚ | | | | | X | ⊚ | X |

From the results of the foregoing examples, it follows that the nonaqueous dispersion-type resins, i.e. the nonaqueous dispersions of the vinyl-modified resin obtained by the process of this invention have the excellent dispersion stability and the uniform particle size.

What we claim is:

1. A process for the production of a nonaqueous dispersion of a resin having excellent dispersion stability and a uniform particle size, which comprises uniformly polymerizing, in an organic solvent selected from the group consisting of esters, ketones, alcohols, and mixtures of an aromatic hydrocarbon and an alcohol, a vinyl monomer having a solubility parameter different by 1.1 or more from that of said organic solvent or a vinyl monomer mixture containing at least 1% by weight of said monomer, said mixture being composed of said monomer and at least one monomer selected from the group consisting of (meth)acrylate monomers, dialkyl ($C_1$-$C_4$) esters of ethylenically unsaturated dicarboxylic acids, cyano group-containing ethylenically unsaturated monomers, vinyl esters; (per)-fluoroalkyl group-containing monomers, halogenated olefins and aromatic vinyl monomers, and a reactive resin soluble in said organic solvent and having a molecular weight of 2,000 or more, to form a uniform polymer solution; and then, while removing said organic solvent from said uniform polymer solution, replacing said organic solvent in the obtained uniform polymer solution with an aliphatic and/or alicyclic hydrocarbon solvent that does not dissolve the obtained resin to thereby conduct phase inversion into a nonaqueous dispersion.

2. The process of claim 1 wherein the vinyl monomer mixture is a mixture of vinyl monomers having reactive atomic groups selected from the member consisting of an ethylenically unsaturated bond, a carboxyl group, a sulfoxyl group, a phosphoxyl group, an acid anhydride group, carbonyl chloride, sulfonyl chloride, a reactive ester linkage, an epoxy group, an isocyanate group and reactive chlorine.

3. The process of claim 1 wherein the reactive resin is a polymer composed essentially of a polymer being an alkyl (meth)acrylate having an alkyl group with 4 or more carbon atoms.

4. The process of claim 1 wherein the reactive resin is a polymer composed essentially of a vinyl monomer having 4 or more carbon atoms.

5. The process of claim 1 wherein the reactive resin is an ethylenically unsaturated bond-containing alkyd resin.

6. The process of claim 1 wherein the reactive resin is a vinyl-modified alkyd resin obtained by grafting a vinyl monomer on an ethylenically unsaturated bond-containing alkyd resin as a backbone polymer.

7. The process of claim 1 wherein the aliphatic hydrocarbon solvent is solvent selected from the group consisting of n-pentane, n-heptane, isoprene, n-hexane and n-dodecane.

8. The process of claim 1 wherein the alicyclic hydrocarbon solvent is a solvent containing methylcyclohexane as an essential component.

* * * * *